United States Patent [19]
Johnson et al.

[11] 3,956,063
[45] May 11, 1976

[54] EMERGENCY CORE COOLING SYSTEM FOR A FAST REACTOR

[75] Inventors: Harry G. Johnson, Richland; Ronald N. Madsen, Pasco, both of Wash.

[73] Assignee: The United States of America as represented by the United States Energy Research and Development Administration, Washington, D.C.

[22] Filed: May 24, 1973

[21] Appl. No.: 363,697

Related U.S. Application Data

[63] Continuation of Ser. No. 147,941, May 28, 1971, abandoned.

[52] U.S. Cl................................. 176/38; 176/65; 176/87
[51] Int. Cl.²......................................... G21C 15/18
[58] Field of Search .................. 176/38, 65, 87, 52, 176/63, 62

[56] References Cited
UNITED STATES PATENTS

| | | | |
|---|---|---|---|
| 2,841,545 | 7/1958 | Zinn | 176/87 |
| 3,098,023 | 7/1963 | Schluderberg | 176/65 |
| 3,182,002 | 4/1965 | Laithwaite et al. | 176/65 |
| 3,242,981 | 3/1966 | Hutchinson et al. | 176/65 |
| 3,525,669 | 8/1970 | Germer | 176/52 |
| 3,793,143 | 2/1974 | Muller | 176/87 |

FOREIGN PATENTS OR APPLICATIONS
1,815,046   6/1970   Germany ............................. 176/65

OTHER PUBLICATIONS

E. F. Beckett et al., *Response of a Piped LMFBR to Primary System Pipe Rupture*, presented at the Nuclear Eng. Conf., Palo Alto, California, Mar. 7–10, 1971, pp. 1–8.
Nuclear Safety, Vol. 6, No. 4, pp. 318–320.

*Primary Examiner*—Harvey E. Behrend
*Attorney, Agent, or Firm*—John A. Horan; Arthur A. Churm; Frank H. Jackson

[57] ABSTRACT

The main heat transport system for a liquid-metal-cooled nuclear reactor is constructed with elevated piping and guard vessels or pipes around all components of the system below the elevation of the elevated piping so the head developed by the pumps at emergency motor speed will be unsufficient to lift the liquid-metal-coolant over the top of the guard tanks or pipes or out of the elevated piping in the event of a loss-of-coolant accident. In addition, inlet downcomers to the reactor vessel are contained within guard standpipes having a clearance volume as small as practicable.

4 Claims, 2 Drawing Figures

EMERGENCY CORE COOLING SYSTEM FOR A FAST REACTOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a simple and reliable system for protecting a power reactor from the effects of an accident or the occurrence of abnormal conditions in the reactor.

The invention also relates to a primary heat transport system for a power reactor which is capable of providing emergency core coooling for the reactor.

The invention further relates to a cooling system for a liquid-metal-cooled, multiple-coolant-loop, fast-breeder power reactor which ensures effective heat removal from the reactor even though one of the coolant loops is disrupted.

It is obvious, of course, that the cooling system for a power reactor should ensure to the utmost extent possible heat removal from the reactor core following an accident or the occurrence of abnormal conditions in the reactor. Thus an Emergency Core Cooling System (ECCS) must be provided supplementing the main Heat Transport System (HTS) to provide cooling in the event the main HTS becomes inoperative. The ECCS and the HTS together must positively ensure that there will always be the necessary heat removal capability to protect the reactor. This capability must exist for a broad spectrum of possible accident conditions from equipment failures to loss of electrical power to complete loss-of-coolant accidents. Not only must this protection exist, it must be provided by as simple and reliable a system as possible in order that its own effectiveness be undiminished by functional unreliability.

No particular preferred system for emergency core cooling of liquid-metal-cooled reactors has been indicated by existing reactors or reactor designs. For example, natural circulation within the main Heat Transport System such as on the French reactor, Rapsodie, protects against equipment failure and loss of electrical power but not against loss of coolant. Other systems used heretofore include a separate natural circulation auxiliary system as in the German design, Na 2, pony motors and doubly-contained piping as on the Fermi reactor, and auxiliary forced circulation system as on the Sefor and SRE-PEP reactors.

SUMMARY OF THE INVENTION

Features added to a conventional Heat Transfer System to ensure emergency core cooling in accordance with the present invention include the following:

1. Primary piping runs elevated above the minimum safe coolant level.
2. Guard vessels and/or standpipes around components and vertical pipe runs up to the level of the elevated piping runs.
3. A limited total dynamic head (TDH) for the primary pump when operating at emergency speeds.
4. Automatic primary and secondary pump coastdown.
5. A guard standpipe of minimum volume around the reactor inlet piping.

Features 1–4 result in a system wherein any possible break in the primary piping can only take effect at an elevation sufficiently above the minimum safe coolant level that the total dynamic head of the pumps at emergency power speeds is not sufficient to lift the coolant to the elevation of the break.

In more detail, the design features added to the piping arrangement to assure accomplishment of the emergency cooling function include:

1. Pipes on the suction side of the primary pumps are elevated high enough above the minimum safe reactor vessel sodium level so that the primary pumps in the unbroken loops at emergency speed cannot pump sodium out of a suction side pipe break by reverse sodium flow from the reactor vessel's inlet plenum, through the check valve, through the shutdown pump and then to the pipe break. These pipes are located below the normal reactor vessel sodium coolant level to facilitate filling of the primary loops and to allow a gravity flow of sodium coolant between the reactor vessel and pumps under normal operation.

2. Pipes on the discharge side of the primary pump are elevated high enough above the minimum safe vessel coolant level so that the pump in a failed primary loop at emergency speed cannot pump coolant out the break (i.e., the pipes are elevated above the minimum safe level by at least the amount of the pump shut-off head at emergency speed).

3. Vertical pipe runs and the primary pumps and intermediate heat exchangers are protected by open top (or with loose fitting covers if covered) guard tanks and/or guard pipes.

4. Dip legs or their equivalent are provided on the reactor outlet piping into the reactor vessel and on the suction piping into the pump tanks to enable siphon action between the reactor vessel and primary pumps when the reactor vessel coolant level falls below the uppermost elevation of the suction piping run.

5. The vertical pipe runs at the primary pumps and intermediate heat exchangers are run inside of the guard vessels to provide backup protection in case of a break in one of these pipes.

6. The pipes between the reactor vessel and pumps suctions are sized to minimize the differences in coolant levels in the vessel and pump barrels in order to minimize coolant level disturbances following loss of coolant, loss of power, and normal scram transients. A steady-state, design point, level difference of less than 6 feet is judged acceptable.

7. Guard standpipes around reactor inlet nozzles and piping are required to minimize loss of sodium and to assure positive core sodium coolant flow during intermediate and large size breaks. The assurance of positive core coolant flow and/or acceptable reactor core temperature conditions may require the use of multiple parallel inlet downcomers and guard standpipes for each primary coolant loop.

8. The guard standpipe free volume is limited (approximately 1.5 ft$^3$ per ft of height or less) to allow for rapid accumulation of sodium coolant (and hydraulic resistance) within the standpipe for breaks in the reactor inlet piping.

9. The guard standpipes overflow is set at the elevation established for horizontal runs of pump discharge piping.

10. The lower end of each guard standpipe is attached to the reactor vessel as close to the vessel's inlet nozzle as possible to enable an immediate accumulation of sodium coolant over the break of an inlet nozzle.

11. Overflows on the heat exchanger and pump guard vessels have the same elevation requirement as the discharge side horizontal piping.

12. Overflows on pump guard vessels and suction side vertical piping guard standpipes have the same elevation requirement as for the pump suction side horizontal piping.

13. The guard standpipes around vertical sections of piping and reactor inlet piping will allow provision for inservice inspection.

SPECIFIC EMBODIMENT OF THE INVENTION

Figure 1:
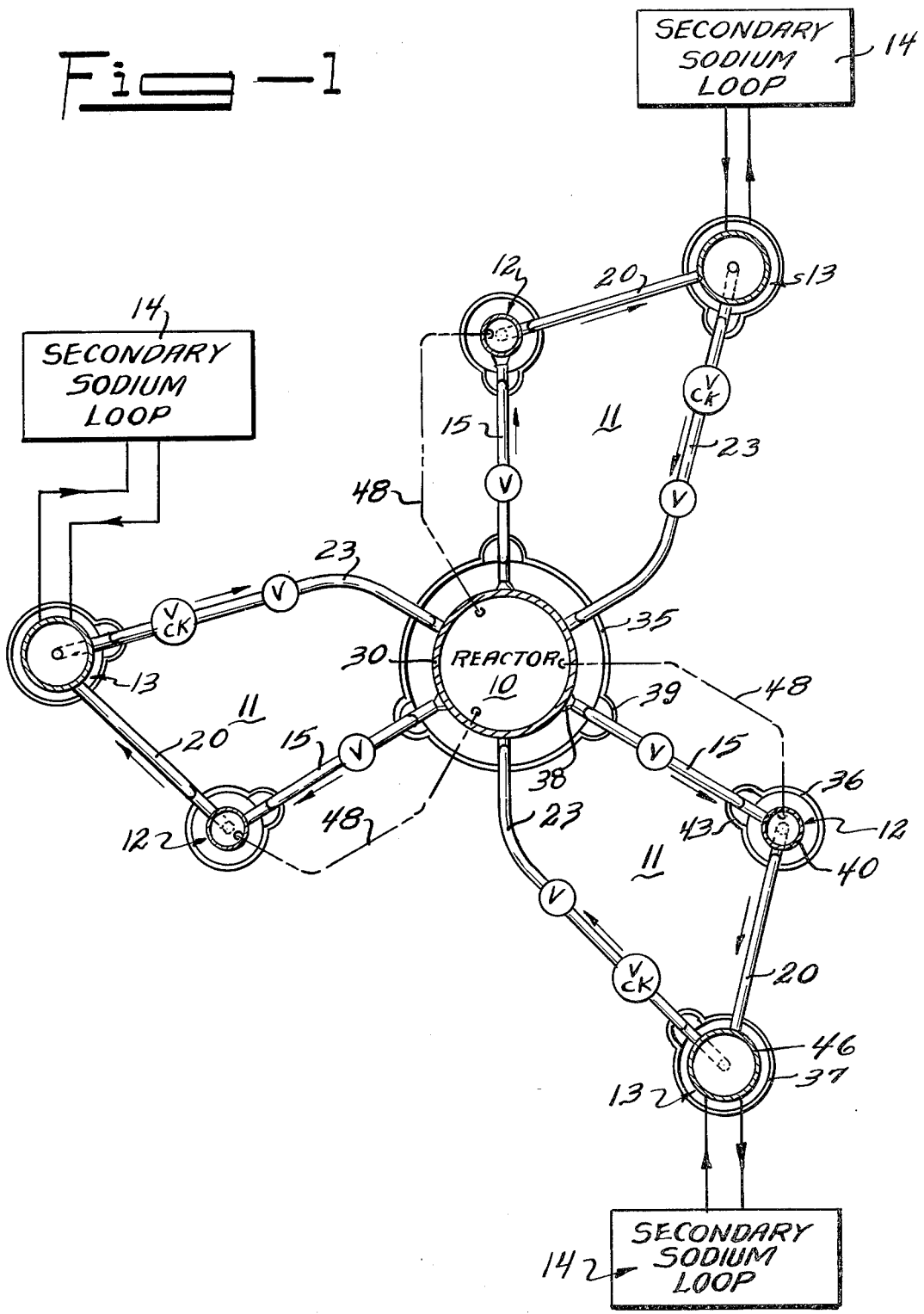
FIG. 1 is a diagrammatic top sectional view of a fast flux test facility in which the present invention is incorporated and FIG. 2 is a diagrammatic vertical section thereof.

As shown in FIG. 1, a nuclear reactor 10 is cooled by sodium flowing through three separate parallel coolant loops 11, which loops constitute the primary heat transport system for the reactor. Each coolant loop 11 includes a pump 12 and a heat exchanger 13. The heat content of primary loops 11 is rejected to secondary sodium coolant loops 14 in heat exchangers 13 and the secondary coolant loops circulate the nonradioactive sodium coolant therein through closed loop piping to air-cooled heat dumps (not shown). The specific facility described herein is the Fast Flux Test Reactor — a 400 MW (Th) materials and fuel testing reactor scheduled for construction at Hanford Laboratory, Richland, Washington. It will be appreciated, of course, that this invention may be applied to a power reactor as well as to a test reactor.

Figure 2:
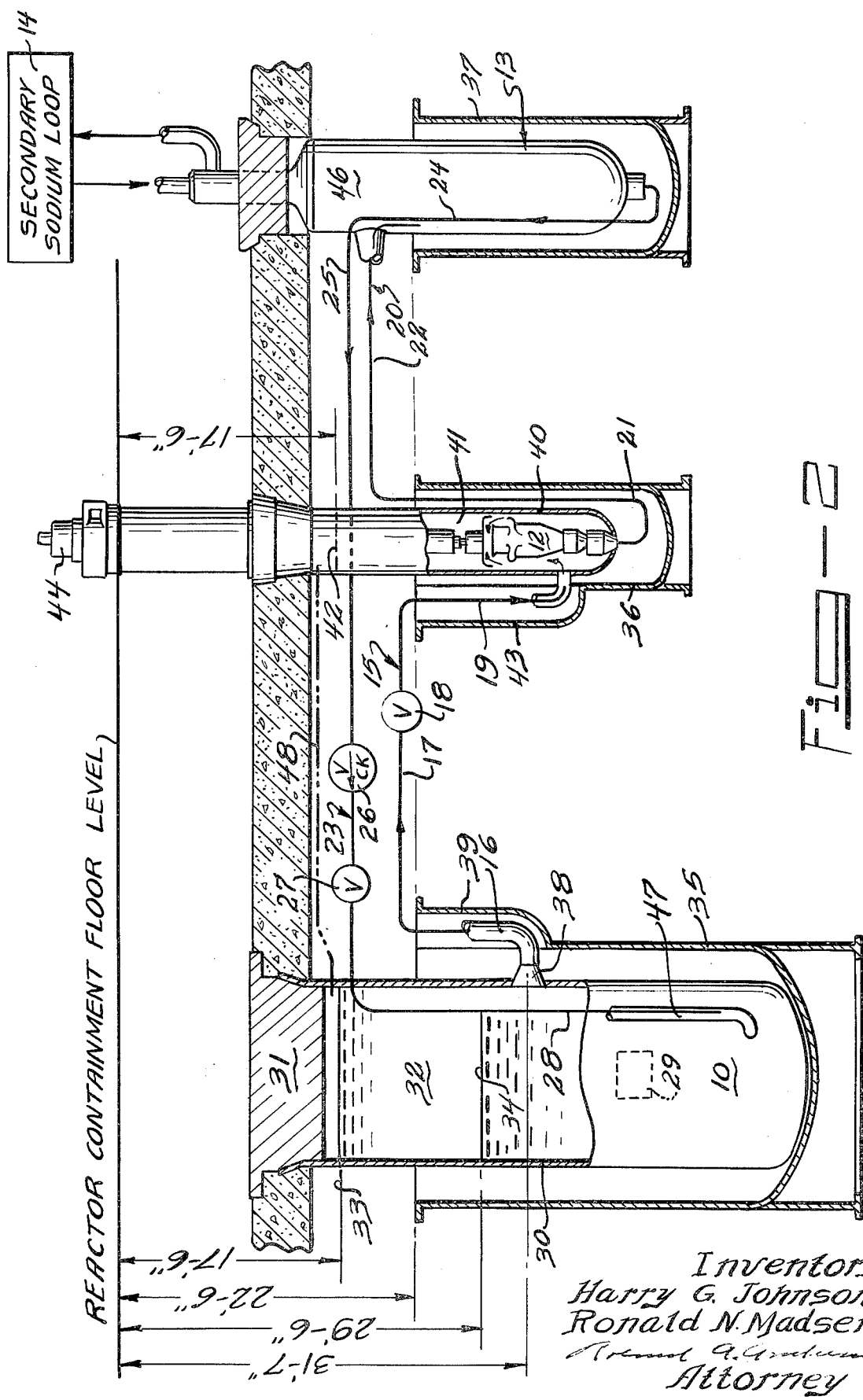

FIG. 2 shows in more detail one of the three identical coolant loops 11. Coolant is pumped from reactor 10 by pump 12 through 28-inch pump suction line 15, which includes a vertical riser portion 16, a horizontal run 17 containing an isolating valve 18, and a vertical downcomer portion 19, to heat exchanger 13 through 16-inch pump discharge line 20, which includes a vertical riser portion 21 and a horizontal run 22, and back to reactor 10 through reactor inlet line 23 which includes a vertical riser portion 24, a horizontal run 25 containing a check valve 26 and an isolation valve 27 and a vertical downcomer portion 28.

As shown, nuclear reactor 10 comprises a core 29 centrally located within a reactor vessel 30 which is provided with a cover or head 31 and within which is located a pool 32 of sodium. The normal safe operating level for the sodium — maintained within the reactor vessel 30 by an overflow tank (not shown) — is denoted by the number 33 and a predetermined arbitrary minimum safe reactor vessel sodium coolant level above the top of the reactor outlet lines has been given the number 34. Elevations will be given herein with reference to the reactor containment floor level. The normal safe operating level for sodium is 17 feet 6 inches below this point and the minimum safe reactor vessel coolant level 34 is 29 feet 6 inches below the reactor containment floor level. The minimum safe reactor vessel coolant level is defined as the lowest permissible reactor vessel sodium coolant level consistent with providing sodium coverage of fuel subassemblies and associated instrumentation. It will be appreciated that this minimum safe reactor vessel coolant level is a coolant level such that the pump suction line nozzle 38 is submerged at all times. As will appear hereinbelow this minimum safe level is a sufficient distance above nozzle 38 to provide a reasonable submergence safety factor.

As is evident from the drawing, inlet lines 23 communicate with the interior of the reactor vessel 30 below the core 29 and suction lines 15 communicate with the interior of the reactor vessel above the core.

To ensure that all portions of the main HTS located below the minimum safe coolant level are located within a guard vessel, reactor vessel 30 is surrounded by reactor guard vessel 35, pump 12 is surrounded by pump guard vessel 36 and heat exchanger 13 is surrounded by heat exchanger guard vessel 37. All guard vessels come up to a point 7 feet above the minimum safe reactor vessel coolant level 33 — 22 feet 6 inches below the reactor containment vessel floor level — and all horizontal piping runs will be above this elevation.

Pump suction line 15 communicates with reactor vessel 30 through nozzle 38. The centerline of nozzle 38 is submerged 2 feet 1 inch below the minimum safe coolant level or 31 feet 7 inches below the reactor containment vessel floor level to prevent gas entrainment by vortexing, to compensate for uneven sodium coolant level in the reactor vessel, to satisfy uncertainties in the pump shut-off head at emergency speed, to allow for unexpected gas pressure unbalances between the reactor vessel and reactor cavity cell and HTS cells, and to provide a reasonable submergence safety factor, all of which ensure continuity of primary sodium flow.

Riser portion 16 of pump suction line 15 is disposed within a blister or bulge 39 forming a part of reactor guard vessel 35 to the level of horizontal run 17 thereof. Horizontal run 17 is high enough above the minimum safe reactor vessel sodium level so that the two primary pumps in the unbroken loops at emergency speed cannot pump sodium out of a suction side pipe break by reverse sodium flow from the reactor vessel's inlet plenum, through the check valve, through the shutdown pump and then to the pipe break. The pipe is located below the normal reactor vessel sodium coolant level to facilitate filling of the primary loops and to allow a gravity flow of sodium coolant between the reactor vessel and pumps under normal operation.

Downcomer portion 19 of pump suction line 15 connects with the lower portion of pump barrel 40 forming a part of pump 12, this serving as the equivalent of the dip leg mentioned earlier. Pump barrel 40 contains a pool 41 of sodium having a level 42 which is 17 feet 6 inches below the reactor containment floor level during periods of zero coolant flow. During normal steady-state operation, the sodium level in the pump falls by approximately 5 feet, an amount which equals the pressure losses between the reactor vessel and the pump. Pump guard vessel 36 is provided with a blister or bulge 43 to protect downcomer portion 19 of the pump suction line 15 and to enable siphon action between the reactor vessel and primary pump when the reactor vessel coolant level falls below the uppermost elevation of the suction piping run.

Pump 12 is a centrifugal, vertical-shaft, single-stage, free-surface, double-suction impeller, electric-motor-driven pump having a design rating of 500 TDH at 14,500 gpm. An auxiliary pony motor 44 will provide sufficient sodium flow during reactor shutdown, refueling and standby operations and for emergency core cooling in the event of a loss in normal off-site power supply. The pony motor pump speed is limited to 5 feet TDH shutoff head for emergency purposes involving loss-of-coolant accidents and accordingly the pony motor will not raise coolant over the top of the guard vessels or through a break in the horizontal runs of the coolant lines.

Pump discharge line 20 is connected to pump 12 at the bottom thereof and riser portion 21 thereof extends vertically upward within guard vessel 36. Horizontal run 22 of pump discharge line 20 runs directly to heat exchanger tank 46 at an elevation high enough above the minimum safe vessel coolant level so that the pump in a failed primary loop at emergency speed cannot pump coolant out of the break. Heat exchanger 13 is located at a higher elevation than the reactor core 29 to assure a reasonable degree of natural circulation cooling capability.

Heat exchanger 13 is of the vertical, shell-and-tube, counterflow type with primary sodium flow on the shell side and secondary sodium flow on the tube side. Vertical portion 24 of reactor inlet line 23 is run from the bottom of heat exchanger tank 46 upwardly within heat exchanger guard vessel 37 to provide backup protection in case of a break in this area of piping. Horizontal run 25 is elevated high enough above the minimum safe reactor vessel coolant level 34 so that the pump in a failed primary loop at emergency speed cannot pump coolant out of the break. Vertical downcomer portion 28 is contained within reactor guard vessel 35. In addition a guard standpipe 47 surrounds vertical downcomer portion 28 to minimize loss of sodium and to assure positive core sodium coolant flow during intermediate and large size breaks in downcomer portion 28. The volume of this standpipe is limited to approximately 1.5 ft$^3$ per ft of height or less to allow for rapid accumulation of sodium coolant within the standpipe for breaks in the reactor inlet piping. This is necessary to prevent flow reversal when a break occurs in the downcomer portion of the reactor inlet line. Since the volume of the stand-pipe is limited, it fills up rapidly when a break in inlet pipe 23 occurs, covering up the break and increasing resistance to outflow through the inlet line. The path of least resistance for coolant flow then continues to be up through the reactor core so coolant continues to flow into the reactor through inlet line 23 rather than out through the inlet line.

Check valve 26 in horizontal run 25 prevents reverse flow of coolant during abnormal operations and isolation valves 18 and 27 in horizontal runs 17 and 25, respectively, permit isolation of one loop from the remainder of the system, though isolation of a coolant loop by operation of the isolation valves is not a necessary requirement of the ECCS.

System operating pressure is maintained through makeup and vent of argon cover gas located in the reactor vessel, reactor vessel surge and overflow tank and pump barrel gas volumes. All system gas volumes are interconnected as by gas equalizing line 48 and pressure is controlled from a single pressure control system.

In order for the system to provide the desired protection, it is essential that an auxiliary pony motor having a limited TDH be provided. Accordingly, emergency motor 44, provided for each pump 12, has a TDH of 5 feet. In a reactor scram following a loss-of-coolant accident the primary motor for pump 12 cuts off and emergency motor 44 cuts in automatically. The pump then coasts down to the speed determined by the emergency motor. The mechanical inertia of the primary pump is large enough to assure that initial cooling is adequate to limit damage to acceptable levels following loss-of-electrical-power and loss-of-primary-sodium-coolant accidents. However, the mechanical inertia of the pump assembly is limited so that the emergency speed head/capacity curve is reached before the reactor and primary loops sodium coolant levels reach the minimum safe level following loss-of-primary-coolant accidents. At the elevation of the piping prescribed, the TDH of auxiliary motor 44 is insufficient to pump coolant out of the break. At the same time, the pump head in the unaffected loops at this coastdown speed is sufficient to maintain the required coolant flow.

Operation of the emergency core-cooling system of the present invention if a loss-of-coolant accident occurs will next be described. Analysis shows that the described system will also protect the reactor in the event of component failure or malfunction and of loss of electrical power. The loss-of-coolant accident is the most serious accident because the accident endangers continued operation of other coolant loops.

Loss-of-coolant accidents on the suction side of the pump between the reactor outlet nozzle and the pump inlet and loss-of-coolant accidents on the discharge side of the pump between the pump discharge and the reactor inlet will be separately discussed, but first there are several events which are common to both cases which can be discussed together.

For any loss-of-coolant accident, the first event following the accident is the detection of the break. This could be from a variety of detectors forming no part of the present invention. The resulting scram signal will release the control rods. Following verification of control rod insertion, pump coastdown to emergency speed is initiated. In the critical period between the occurrence of the accident and the beginning of pump operation at emergency speed, coolant flow, and hence the cooling of the core, is provided by the inertia of the HTS components, both fluid and mechanical.

With these events and considerations in mine, both of the loss-of-coolant accidents will be discussed in detail. As coolant flows out of a break in the pipe on the suction side of the pump, the flow into the pump barrel in the affected loop will be reduced. The coolant level in both the vessel and the pump barrel will then fall. The coolant level in the reactor vessel falls until the pool elevation is at the level of the pipe rupture if the check valve closes to completely prevent loop flow reversal. Since the outlet nozzle is still submerged by about 8 feet, the pumps in the two unaffected loops are still able to continue to circulate coolant because the pipe between the reactor vessel and the pump barrel and including the heat exchanger is a siphon connecting the coolant pool in the reactor with that in the pump barrel. As soon as the flow in the damaged line ceases due to the pump barrel being exhausted, the check valves will close to prevent any reverse coolant flow in the loop.

The rupture of or a leak in the pump barrel will cause exactly the same sequence of events as above due to the guard vessels around these components. These guard vessles come up to the elevation of the bottom of the suction pipe and thus will collect coolant to that level. The systems will thus behave as if the leak were at that elevation, which is what is described above.

In the event of a break on the discharge side of the pump, verification of scram initiates the pump coast down and the coolant level in the pump barrel will soon equalize with the level in the reactor vessel. The loss of coolant will continue until the pump no longer has sufficient head to lift coolant up to the level of the break. It is for this reason that the pump shut-off head at emergency speed is only 5 feet above the minimum coolant pool level. When the pool reaches this minimum level the pump flow stops. The other two pumps continue to circulate coolant as the head at emergency flow rate is sufficient to overcome the flow losses in their circuits and the inlet nozzles are still well submerged.

The vertical discharge risers from the pump are contained within the pump barrel in order to provide protection against a rupture in one of these lines. The guard tank would fill with coolant, effectively locating the break at the top of the guard tank. This break will cause the same sequence of events as above for a break in a horizontal pump discharge pipe. Compounding this accident with the additional failure of the pump barrel does not significantly change the net effect. The remaining two loops would still operate to provide the necessary cooling function.

The check valves in the damaged reactor inlet line should close almost immediately following the accident to prevent backflow through the damaged circuit. As in the previous description, sufficient elevation exists at any possible rupture location so that the two operating pumps have insufficient head to cause a continuing coolant loss via reverse flow in the damaged loop even should the check valve fail to close. If the break is below the elevation of the check valve, sodium quickly fills the standpipe around the downcomer to provide sufficient head over the break to force the maximum amount of coolant up through the core and to prevent the other pumps from pumping an excessive amount of coolant out of the break.

While the cooling system described above has the pump in the hot leg of the coolant loop, it is also possible to place the pump in the cold leg of the coolant loop while retaining the benefits of the present invention. It makes no difference whether the pump is located in the hot or cold leg of the coolant loop as far as the ECCS function of the Heat Transport System is concerned.

The embodiments of the invention in which an exclusive property or privilege is claimed are defined as follows:

1. In a liquid-metal-cooled nuclear reactor incorporating a core disposed within a reactor vessel and including a primary heat transport system for the reactor consisting of a plurality of primary coolant loops each including a pump and a heat exchanger, said reactor vessel, pumps, and heat exchangers being connected by piping including horizontal and vertical coolant runs, the inlet lines for the reactor communicating with the interior of the reactor vessel below the core and the pump suction lines communicating with the interior of the reactor vessel above the core, said reactor vessel containing liquid metal coolant to at least a predetermined arbitrary minimum safe reactor vessel coolant level above the top of the reactor outlet lines, and means for operating the pumps at a predetermined normal operating total dynamic head and pony motors for operating the pumps at a predetermined lower total dynamic head at emergence speed, the improvement comprising guard vessels surrounding the reactor vessel, the pumps, the heat exchangers and vertical runs of the piping, separate guard vessels being provided for the reactor vessel and each pump and heat exchanger, the top of the guard vessels extending above said minimum safe reactor vessel coolant level by a distance at least equal to the total dynamic head of the pumps at emergency speed, all horizontal runs of the piping being elevated above the top of the guard vessels and wherein the verticle portion of the reactor inlet line disposed within the reactor guard vessel is surrounded by a standpipe having a free volume of less than about 1.5 cubic feet per foot of height.

2. The improvement of claim 1 wherein the heat exchanger is at a higher elevation than the reactor core to assure that natural circulation of coolant will occur if there is a complete loss of all power.

3. The improvement of claim 2 wherein each pump has a total dynamic head of 500 feet for normal operation and of 5 feet for emergency operation and the top of the guard vessels is 7 feet above the minimum safe coolant level.

4. In a liquid-metal-cooled nuclear reactor incorporating a core disposed within a reactor vessel and including a primary heat transport system for the reactor consisting of a plurality of primary coolant loops each including a pump and a heat exchanger, said reactor vessel, pumps, and heat exchangers being connected by piping including horizontal and vertical coolant runs, the inlet lines for the reactor communicating with the interior of the reactor vessel below the core and the pump suction lines communicating with the interior of the reactor vessel through a discharge nozzle disposed above the core, said reactor vessel containing liquid metal coolant to at least a point above the top of the reactor discharge nozzle such that the discharge nozzle is submerged at all times, means for operating the pumps at a predetermined normal operating total dynamic head, a pony motor for operating the pumps at a predetermined lower total dynamic head at emergency speed, the improvement comprising guard vessels surrounding the reactor vessel, the pumps, the heat exchangers and vertical runs of the piping, separate guard vessels being provided for the reactor vessel and each pump and heat exchanger, the top of the guard vessels extending above the top of the reactor outlet nozzle by a distance at least equal to the total dynamic head of the pumps at emergency speed, all horizontal runs of the piping being elevated above the top of the guard vessels and wherein the verticle portion of the reactor inlet line disposed within the reactor guard vessel is surrounded by a standpipe having a free volume of less than about 1.5 cubic feet per foot of height.

* * * * *